United States Patent
McIntyre

[15] 3,665,534
[45] May 30, 1972

[54] FISHING FLOAT MOTOR SUPPORT

[72] Inventor: Hubert L. McIntyre, 1406 E. Tonkawa, Tonkawa, Okla. 74653

[22] Filed: June 11, 1970

[21] Appl. No.: 45,452

[52] U.S. Cl. .................................................................9/2 A
[51] Int. Cl. ............................................................B63h 7/08
[58] Field of Search.........................9/2, 2 A, 25, 11, 11 A, 5

[56] References Cited

UNITED STATES PATENTS

| | | | |
|---|---|---|---|
| 2,674,753 | 4/1954 | Wood | 9/11 |
| 3,324,488 | 6/1967 | Schutz, Jr. | 9/1 |

*Primary Examiner*—Milton Buchler
*Assistant Examiner*—Carl A. Rutledge
*Attorney*—Robert K. Rhea

[57] ABSTRACT

In a fishing float motor support, a framework reinforced polygonal-shaped generally horizontal buoyant body is provided with an arcuate recess nesting a peripheral portion of a conventional fishing float. Means on the body secures it to and maintains it in the plane of the fishing float. An upstanding transom, connected with body reinforcing framework, supports an outboard motor. Upwardly open sockets, formed in the body, support fishing equipment and a battery to provide electrical energy for the motor.

2 Claims, 5 Drawing Figures

PATENTED MAY 30 1972 3,665,534
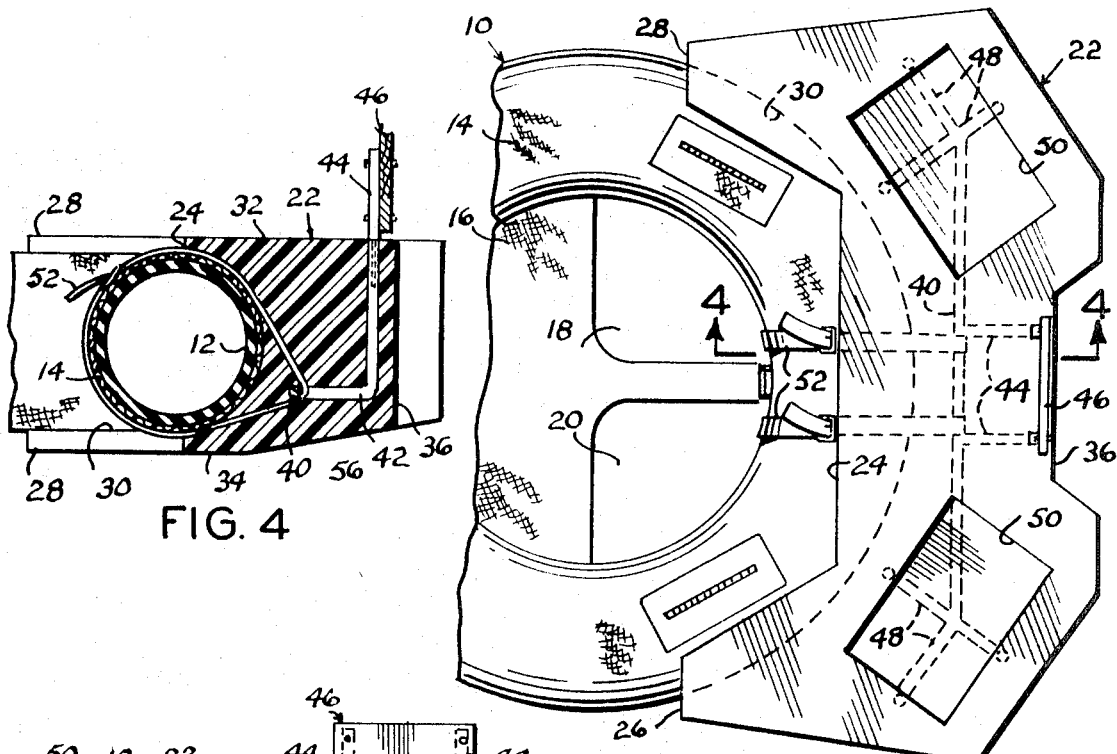
FIG. 2
FIG. 4
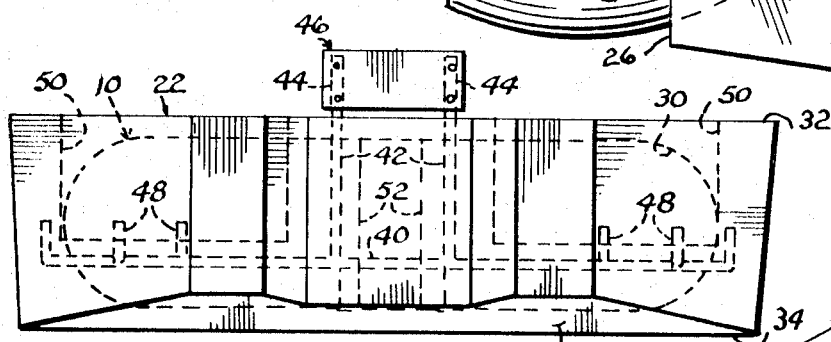
FIG. 3
FIG. 5
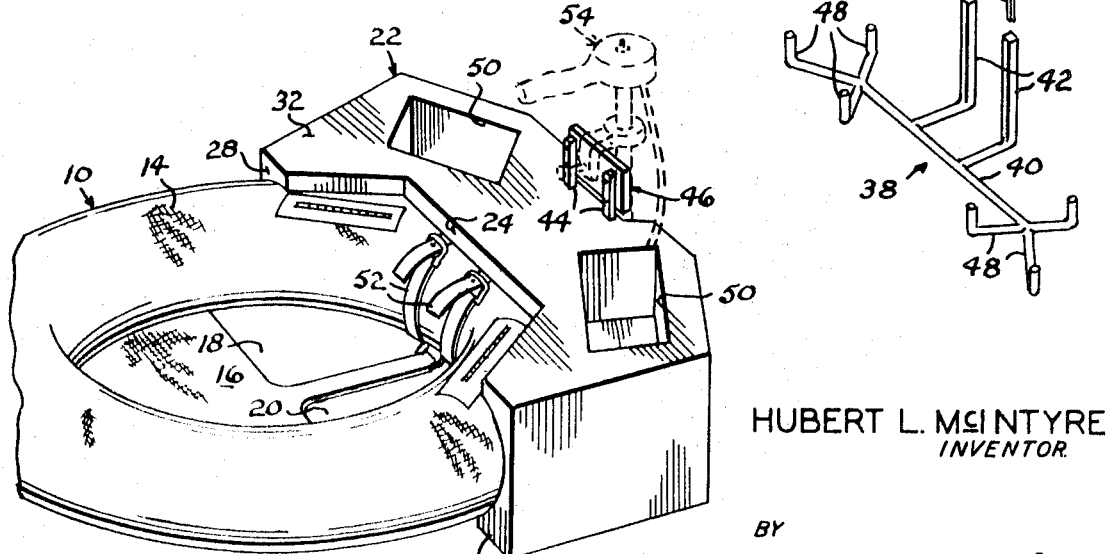
FIG. 1
HUBERT L. McINTYRE
INVENTOR.
BY
Robert K. Rhea
AGENT

FISHING FLOAT MOTOR SUPPORT

BACKGROUND OF THE INVENTION

1. Field of the Invention.

The present invention relates to fishing floats and more particularly to a motor supporting device for connection with a conventional ring-like fishing float.

Conventional toroidal or ring-like fishing floats comprise a fabric covering surrounding a pneumatic tube and includes a central seat which supports an occupant adjacent the surface of a body of water when the occupant is seated within the float. The occupant usually wears waders for excluding water and propels himself across the water by foot action which may or may not include fins attached to his feet. Such foot propelling movement through the water from one selected fishing position to another is relatively slow. The configuration of the ring-like fishing float is not readily adaptable to the use of auxiliary power for propelling the float.

It is therefore desirable to provide a means for connecting a relatively small outboard motor to a fishing float for propelling the float and its occupant across a body of water.

2. Description of the Prior Art.

U.S. PAT. No. 2,674,753 discloses a fisherman's boat formed by spaced fore and aft sections joined by stringers which secure a float ring therebetween. The principal distinction between this patent and the present invention is that applicant uses only a forwardly disposed reinforced buoyant body which nests a peripheral portion of the float and includes a transom for supporting a motor.

SUMMARY OF THE INVENTION

A generally horizontally disposed polygonal-shaped body, formed of buoyant material, is provided with an arcuate recess in one of its sides for nesting a peripheral portion of a conventional fishing float and disposing the float and body in a common plane. A metallic frame embedded in the body forms a rigid support for a boat supporting transom on that side of the body opposite the float while flexible means, connected with the framework, secures the float-ring to the body. Upwardly open frame reinforced sockets formed in the body accommodates a motor operating battery and fishing supplies.

The principal object of this invention is to provide a motor supporting buoyant body which may be removably connected with a conventional ring-like fishing float.

DESCRIPTION OF THE DRAWINGS

FIG. 1 is a perspective view of the device connected with a fragmentary portion of a toroidal fishing float and illustrating a motor connected therewith by dotted lines;

FIG. 2 is a top view of FIG. 1, to a larger scale, with the motor removed;

FIG. 3 is an elevational front view of FIG. 2;

FIG. 4 is a fragmentary vertical cross-sectional view taken substantially along the line 4—4 of FIG. 2; and, FIG. 5 is a perspective view of the body reinforcing frame illustrating the transom supported thereby in exploded relation.

DESCRIPTION OF THE PREFERRED EMBODIMENT

Like characters of reference designate like parts in those figures of the drawings in which they occur.

In the drawings:

The reference numeral 10 indicates a conventional fishing float. The fishing float 10 is toroidal in general configuration comprising an inner inflatable member 12 formed of resilient material, such as rubber, and may be a truck tire inner tube, or the like, which is surrounded by a flexible fabric covering 14 with the edges thereof joined as by stitching, not shown. Another section of similar fabric material forms a seat 16 which is joined to the ring-like cover 14 and extends across the central opening of the float 10 with openings 18 and 20 formed in the fabric 16 defining leg receiving openings for the occupant when supported by the seat 16.

The reference numeral 22 indicates a motor supporting, normally horizontally disposed, body preferably formed of lightweight buoyant material, such as plastic, having an overall length slightly greater than the diameter of the float-ring 10. The transverse dimension of the body is less than its longitudinal dimension but greater than the diameter of the closed curve forming the toroidal shape of the float 10. The vertical thickness of the body 22 is similarly greater than the vertical thickness of the float-ring 10 when horizontally disposed. One longitudinal side edge of the body 22 is formed to substantially define a U-shaped configuration, having a bight portion 24 and defining leg members 26 and 28. This U-shaped longitudinal side surface of the body 22 is further provided with an arcuate recess 30, extending inwardly in spaced relation with respect to the upper and lower surfaces 32 and 34 of the body beyond the vertical plane of the bight portion 24 toward its opposite side or forward edge surface 36. The arcuate recess 30 is formed complemental with respect to the outer periphery of the float-ring 10 for nesting a portion of the float-ring therein wherein the body surface defining the bight portion of the U-shape and the adjacent portion of the respective legs 26 and 28 are divided to form upper and lower U-shaped body edges which overlie and underlie the respective upper and lower surfaces of the nested portion of the float-ring. The length of the arc formed by the recess 30 and subtended by the plane defined by the free ends of the legs 26 and 28 is such that a peripheral portion or arc of the float-ring 10, greater than one-fourth its circumference and less than one-half its circumference, is nested by the body recess 30.

The body 22 is reinforced by a frame 38 embedded therein. The frame 38 comprises an elongated rod-like member 40 extending longitudinally of the body and having a pair of spaced-apart forwardly and upwardly projecting tubular leg members 42 secured to the member 40, intermediate its ends. The legs terminate at their upwardly disposed ends in the plane of the upper surface 32 of the body. The upwardly projecting end portions of these legs 42 telescopically receive a pair of standards 44 secured to one surface of a panel forming a transom 46. The respective ends of the rod member 40 are connected with a plurality of angularly positioned prongs 48 which underlie and support material, not shown, positioned within a pair of upwardly open sockets 50 formed in the respective end portions of the body 22.

In addition to adding rigidity to the body 22 the frame 38 provides means for securely fastening the body to the fishing float 10. I preferably accomplish this by a pair of flexible elements, such as buckle equipped fabric straps 52, which are extended around a medial portion of the rod member 40 and encompass an adjacent portion of the float-ring 10 with the straps projecting through the respective leg openings 18 and 20. Thus, it may be seen, in FIGS. 1 and 4, that the U-shaped configuration of one side of the body substantially conforms to the arc of the float periphery encompassed and permits freedom of movement of the occupant supported by the float-ring 10 while the recess intersected body leg members 26 and 28 partially overlying respective upper and lower surfaces of the float-ring 10, laterally and rearwardly of the strap connected portion of the float-ring, securely maintains the plane of the body in the plane of the float-ring by resisting any pivoting movement of the body about its strap connection with the float in response to wave action, or the like.

The mass of the body 22 is such that it may be easily transported by the user when connected with the float 10. During use an electrical powered trolling motor, or the like, indicated by the dotted lines 54, is mounted on the transom 46 with electrical energy for operating the motor in the form of a battery, or the like, not shown, being supported by one of the sockets 50. As shown in FIGS. 3 and 4, the forward bottom surface of the float body is inclined upwardly, as at 46, for ease in forward movement of the body against wave action.

Obviously the invention is susceptible to changes or alterations without defeating its practicability, therefore, I do not wish to be confined to the preferred embodiment shown in the drawings and described herein.

I claim:
1. A fishing float motor support, comprising: an elongated buoyant body having parallel upper and lower surfaces and having rearward and front sides,
said rearward side being deformed to substantially define a U-shape having a bight portion and diverging leg portions,
said body having an arcuate recess coextensive with and extending inwardly of the rearward side forming the diverging leg portions and bight portion of the U-shape between the upper and lower surfaces of said body for contiguously nesting a peripheral portion of a ring-like fishing float; and,
flexible band means connected with said body and adapted to connect said body with a portion of a float-ring disposed within the arcuate recess.
2. The motor support of claim 1 and further including:
a rigid frame longitudinally embedded within said body, said frame including a pair of upwardly projecting spaced-apart tubular frame legs terminating in the plane of the upper surface of said body adjacent its forward side; and,
a transom including a pair of depending standards removably received in telescoping relation by the upwardly disposed end portions of said frame legs.

* * * * *